April 5, 1955

C. KYLE ET AL 2,705,442

APPARATUS FOR FORMING FIBROUS ARTICLES FROM PULP

Filed Dec. 1, 1950

INVENTORS:
COLIN KYLE &
WILLIAM W. HAERTHER, JR.,
BY Spencer, Johnston, Cook & Root
ATT'YS

April 5, 1955    C. KYLE ET AL    2,705,442
APPARATUS FOR FORMING FIBROUS ARTICLES FROM PULP
Filed Dec. 1, 1950    6 Sheets-Sheet 4

INVENTORS:
COLIN KYLE &
WILLIAM W. HAERTHER, JR.,
BY Spencer Johnston,
Lok & Root
ATT'YS

2,705,442

APPARATUS FOR FORMING FIBROUS ARTICLES FROM PULP

Colin Kyle and William W. Haerther, Jr., Geneva, Ill., assignors to Hawley Products Company, St. Charles, Ill., a corporation of Delaware Application December 1, 1950, Serial No. 198,574

7 Claims. (Cl. 92—56)

The present invention relates to a method of and apparatus for making fibrous articles.

More specifically the invention relates to a method of making one-piece molded articles of fibrous construction by a wet accretion process and also to a machine by means of which the method may be continuously carried out to produce the fibrous articles on a large scale, rapidly and economically. The machine illustrated herein is fully automatic and cyclically operable, but it will be fully understood that such automatic operation is not essential and the machine may be designed for semi-automatic or manual operation if desired.

The apparatus illustrated herein has been designed for use in the production of porous filter elements suitable for use in connection with liquid systems, as for example, the circulatory water system of an internal combustion engine. The apparatus, however, is capable of other uses and the same may, with or without modification, be employed in the production of other fibrous articles, such as sound producing members designed for acoustical purposes, containers or receptacles such as dishes, trays, or the like, articles of clothing, such as tropical hats, and articles of a similar nature too numerous to mention.

The filter element formed by the present method and apparatus is generally of cup- or dish-shaped configuration and is caused to initially assume its final form by an accretion process upon a contoured male former so that the elements are seamless, of uniform thickness throughout and light in weight. Filter elements produced according to the present invention and by the present apparatus are found useful in connection with the filtering of the circulatory water system of an internal combustion engine, although it will be understood that filters capable of other uses may readily be manufactured by the present method and apparatus. This accretion process commences at the beginning of a machine cycle and may be continued throughout a large portion of the cycle. The accretion process takes place upon a porous contoured former submerged in a dilute fibrous bath, which is to say that the fibrous material is extremely sparce in the supporting liquid, which may be and preferably is water, so that large quantities of the liquid are involved for the accretion of each filter element. Means are provided for controlling the density of the fibrous material in the bath, and in this manner the density of the completed and dried filter element may be controlled inasmuch as the general rule holds true that the denser the fibrous bath the more dense will be the completed article.

The accretion process is referred to herein as the felting operation, or the felting portion of the machine cycle and involves the application of suction to the male former. After the felting portion of the cycle, the male former with the accreted blank still upon it, is elevated above the level of liquid in the fibrous bath and the application of suction to the blank is terminated and atmospheric pressure is allowed to obtain through the male former and blank to permit the fibrous particles to adjust themselves and lend a certain degree of "fluffiness" to the article and enhance its porous nature. Immediately thereafter the blank, still upon the former, is brought into register with a porous female former which is complementary in shape to the shape of the male former and consequently determines the outside contour and dimensions and assists in the drying operation by extracting a relatively large portion of the residual moisture from the porous accreted article. The transfer of the article from the male to the female former is effected by the application of vacuum or suction to the latter while the two are in close proximity and positions of register, with the porous article therebetween. The drying operation continues by the passing of air through the article under the influence of suction acting through the porous female former and the article supported thereby. This portion of the machine cycle, wherein the article is transferred from the male to the female former, is referred to as the transfer operation or the transfer portion of the cycle. The portion of the cycle immediately following, wherein continued application of suction to the female former with the article thereon, is referred to herein as the cold drying portion of the machine cycle.

After the transfer portion of the cycle and while suction is still being applied to the female former to effect the cold drying portion of the cycle, the male former is moved downwardly toward the fibrous bath preparatory to commencing the next machine cycle and, when sufficient clearance is attained, a movable chamber, hereinafter referred to as the "oven" is moved into position beneath the female former, with the article still on the latter, and the oven, in so moving, is brought into register with a hot gas flame, while at the same time it is moved into sealing register with the female former so that the continued application of suction to the latter will draw hot gasses and air resulting from the flame through the partially dried blank. The oven remains in position during the remainder of the cycle and also during a portion of the next succeeding cycle and is not withdrawn until a predetermined point in the latter cycle. The application of suction to the female former is also continued into the next cycle, with the oven thus advanced and a hot drying operation takes place during this time and is continued from one cycle to the next. The suction is then discontinued and the female former is subjected to atmospheric pressure for a short time during which a slight cooling of the blank and adjusting of the fibers thereof takes place, after which a reverse blast of air under pressure is applied to the female former and is sufficient to force the hot-dried article from the female former into the oven by gravity and the oven is then immediately withdrawn while the next ensuing cycle is in progress. This last operation is referred to as the ejecting operation, or the ejecting portion of the machine cycle and is of very brief duration.

Accretion of an article thus commences at the beginning of one machine cycle but the completed article is not delivered from the female former until a considerable portion of the next succeeding cycle has taken place and by this time accretion of another article has already begun in a succeeding cycle.

The oven, in addition to serving its drying function during the hot drying portion of the machine cycle, also serves as a carrier and removes the ejected articles from the drying zone and delivers the same to a point of discharge. For this purpose the bottom of the oven is caused to drop away at the point of discharge and release the article into a suitable receptacle. This portion of the cycle is referred to as the discharge portion.

During the reentry of the male former into the fibrous bath and immediately prior to commencement of a machine cycle, a charge of liquid is applied to the empty male former to loosen any dried particles adhering to the former and disperse them in the liquid bath. After the machine cycle commences and when the male former assumes its accreting position, the inside of the same is opened to suction for the entire felting portion of the cycle. The process is continuous and during each cycle means are provided for regulating the feed of liquid and fibrous material to the fiber bath so that the correct or desired proportion of liquid to solid substance is constantly maintained. This means is entirely automatic in its operation except for the provision of a manual adjustment whereby the proportions of solid substance to the liquid carrier may be altered to accommodate different conditions of manufacture.

The provision of a fully automatic machine of the character briefly outlined above being the principal object of the invention, another object is to provide an apparatus in which the filter element undergoing formation may be accreted on a male former submerged in a fiber or felting bath or pool, the male former elevated into register with a female former, the moist accreted article transferred by the application of vacuum to the female former and the continued application of such vacuum utilized to perform a cold drying operation, followed by a hot drying operation, still utilizing such continued application of vacuum to the female former.

Another object is to provide an apparatus of this character wherein after the transfer operation has taken place the male former may be returned to the fibrous bath for a subsequent forming operation during a succeeding machine cycle, while a hot drying operation is performed upon the transferred blank and is continued into the succeeding machine cycle.

Yet another object is to provide an apparatus of this character wherein the hot drying cycle is occasioned by the positioning of a chamber or oven into simultaneous register with a source of hot drying gases and with the female former so that suction applied to the latter will draw the hot gases through the oven and through the article on the female former.

Another object is to provide such an apparatus wherein the oven, in addition to performing its function in connection with the hot drying operation, also serves as a receptacle to receive the completed articles and as a carrier to transfer the same to a point of discharge.

Another object is to provide a cyclically operable accretion molding machine of this character wherein all of the machine operations are controlled by a series of cam controlled electrical contacts which operate under the control of respective cams, all of which are operated from a common timing motor.

With these and other objects in view, which will become more readily apparent as the nature of the invention is better understood, the same consists in the novel construction, combination and arrangement of parts shown in the accompanying five sheets of drawings.

In these drawings:

Fig. 11 is a time chart of the operation of the electrical and mechanical devices of the apparatus.

In all of the above described views similar characters of reference are employed to designate similar parts throughout.

Figure 1:
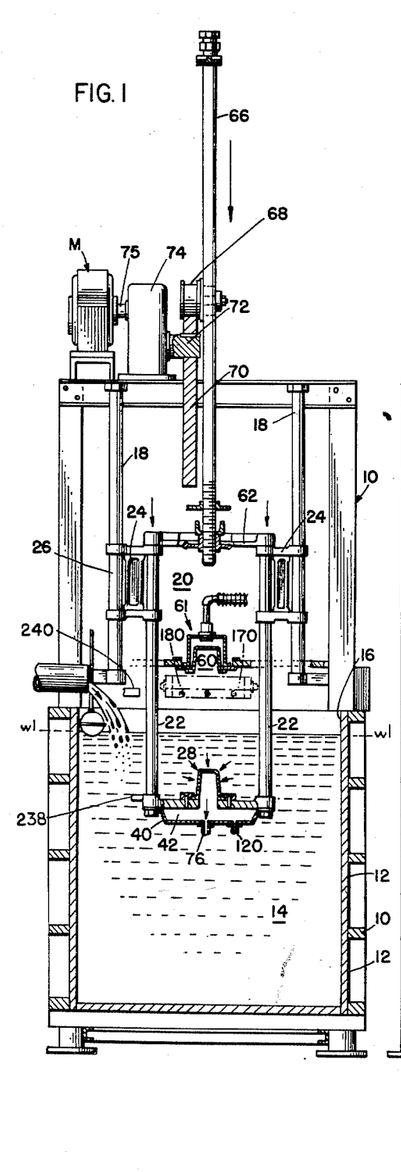
Fig. 1 is a front elevational view partly in section of a filter forming apparatus constructed in accordance with the principles of the present invention and showing the parts occupying the positions which obtain during the felting portion of the machine cycle.
Figure 2:
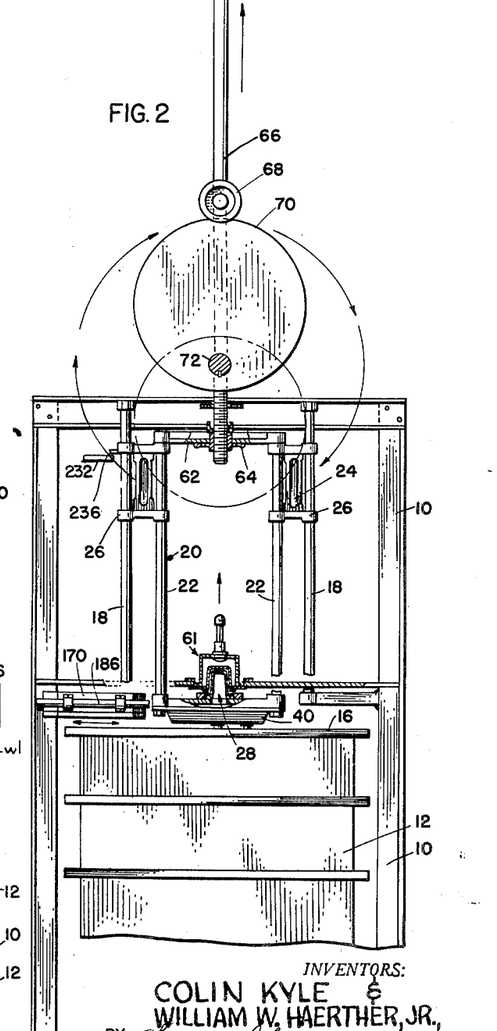
Fig. 2 is a side elevational view of the structure shown in Fig. 1 with the parts assuming the positions they occupy at the commencement of the cold drying portion of the machine cycle.
Figure 2:
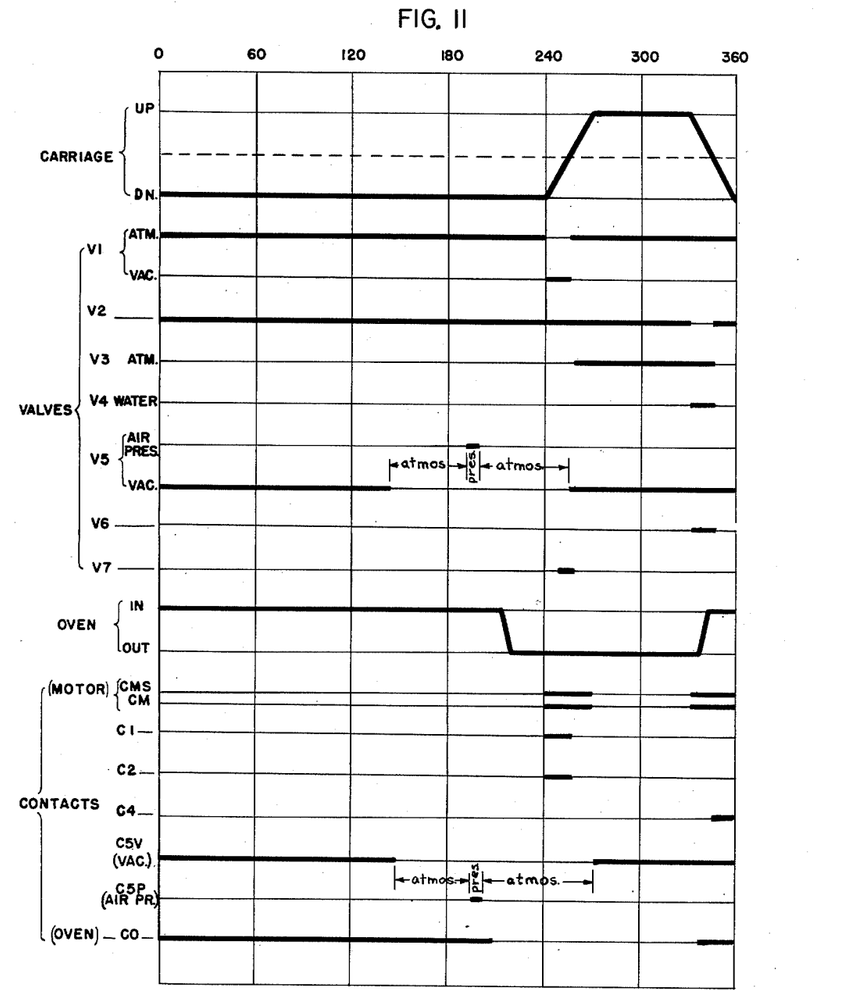

Referring now to the drawings in detail and in particular to Figs. 1 and 2, the apparatus involves in its general organization a stationary machine framework designated in its entirety at 10 comprised of structural members suitably secured together and in which there is supported adjacent the bottom thereof a liquid receptacle or tank 12 providing a fiber bath 14 which may consist of a dispersion of fibers in water. The nature of the fiber bath 14 may vary widely depending upon the availability of materials and the characteristics desired in the finished product. Where the filter elements undergoing formation are to be employed in connection with the circulatory water system of an internal combustion engine, the liquid vehicle of the bath 14 may be water, while the dispersed fibrous material therein may be cellulosic fibers, as for example, wood pulps, such as Kraft pulp, or sulphite pulp, cotton linters, and the like. One satisfactory fibrous material which may be employed is comprised of 50% cotton linters and 50% rag stock. The fiber bath 14 is of a very dilute nature, which is to say that the dispersion of fibers therein is extremely sparce and large quantities of the liquid are employed for the formation of each individual filter.

The tank 12 may be of any suitable shape, it being shown as cylindrical in the present instance, and is provided with an open top or rim portion 16. The tank 12 is adapted to be maintained substantially filled with the liquid material of the fiber bath and accordingly the water line $wl$ is shown as being maintained adjacent the top of the tank. Suitably supported from the framework 10 are a plurality of vertically extending guide rods 18 which serve as guides for a vertically reciprocable carriage 20 which is of cage-like design and includes a plurality of vertical corner posts 22, each of which carries adjacent its upper end a guide bracket 24 having formed thereon a sleeve portion 26 which is slidable on a respective guide rod 18. Supported at the lower regions of the carriage 20 is a male mold assembly designated in its entirety at 28, including a male former proper 30 (see also Figs. 3 and 5), which in the present instance is shown as being of inverted cup-shaped design and having an annular attachment flange 32 which is secured by means of an anchoring ring 34 and studs 36 to a plate or table portion 38 suitably supported from the vertical corner posts 22. A series of perforations 35 are formed in the body portion of the male former 30 and provide means whereby air or liquid may be passed through the walls of the former in either direction in accordance with the principles of the present method at suitable times in the machine cycle for purposes that will become clear presently. A relatively fine wire screen 37 is placed over the male former 30 and is substantially coextensive therewith and has a flange portion 39 underlying the anchoring ring 34. A cavity-forming closure member 40 underlies the plate or table 38 and provides therewith a chamber or cavity 42 which communicates through an opening 44 in the plate 38 with the interior of the male former 30.

In order to hold the various parts of the assembly 28 in their proper relationship, the lower ends of the corner posts 22 are threaded as at 46 and the plate or table 38 is provided with a plurality of bosses 48 through which the threaded portions 46 of the posts 22 extend. The threaded portions 46 of the corner posts 22 also extend through openings provided in the closure member 40 and a clamping nut 50 is threaded onto the end of each corner post to bind the closure member 40 to the plate 38 in sealing relationship. A suspension rod 52 depends from the right hand corner post 22 shown in Fig. 3 and performs a function which will be subsequently described.

The carriage 20 is movable between a lower position wherein the entire male mold assembly is submerged in the fiber bath 14 to an elevated position wherein the male former 30 is brought into register with a female former proper 60 which constitutes a part of a female mold assembly designated in its entirety at 61. Toward these ends a spider 62 extends across the upper end of the carriage 20 and has adjustably secured thereto, by means of a handwheel and screw assembly 64, the lower threaded end of a suspension rod 66. A cam follower roller 68 (Figs. 1 and 2) is mounted on the rod 66 medially thereof and is adjustable longitudinally of the rod. The cam follower roller 68 is designed for cooperation with a circular cam wheel 70 on the periphery of which it is adapted to ride. The cam wheel 70 is eccentrically mounted on the driven shaft 72 of a gear reduction device 74 which is operatively connected by the driving shaft 75 to a driving motor M. The cam follower roller 68 is adjustable longitudinally of the suspension rod 66 for the purpose of adjusting the throw of the carriage 20 to accommodate different conditions of manufacture.

The motor M is of the high torque variety and the windings thereof exist in a motor circuit, the open and closed movements of which are controlled by means of a timer mechanism, which in turn operates under the control of a timing motor Mt (Fig. 8), all in a manner that will subsequently be described. The motor M is adapted to be energized at predetermined points in the machine cycle to move the carriage 20 from its lower position to its elevated position, and vice versa.

The chamber 42 (Fig. 3) is operatively connected by means of a conduit 76 to one branch of a 3-way T-connection 78 and another branch of the connection communicates through a conduit 80, with the outlet port of a shutoff valve V2. The inlet port of the valve V2 communicates through a flexible conduit 82 with the outlet port of a 2-way directional valve V1. One inlet port of the valve V1 communicates through a conduit 84 with the atmosphere and the other inlet port communicates through a conduit 86 with a source of vacuum (not shown).

The third branch of the T-connection 78 communicates through an angular conduit system 88 which terminates in an elbow 90 providing a downwardly facing valve seat 92 designed for cooperation with a shutoff ball float member 94 carried in a cage 96 secured to and movable with the elbow 90. The valve seat 92 and ball float valve member 94 constitute in combination a float valve which has been designated in its entirety at V3. It will be seen that the hydraulic assembly just described above and including the valves V2 and V3, the various conduits and connections 76, 78, 80, 82, together with the elbow 90 and valve structure 92, 94, constituting the valve V3, are movable bodily with the carriage 20. The valve V1 may be submerged in the fiber bath 14 contained within the tank 12 and may be fixedly supported in any suitable manner within the tank. The flexible connection 82 permits freedom of movement between the two valves V1 and V2 as the carriage is reciprocated vertically.

The 3-way valve V1 is of conventional design and operates under the control of a valve handle 98, the free end of which is pivoted to an operating rod 100, which in turn is connected to the movable core 102 of a control solenoid S1, which is pivoted as at 103 to a stationary part of the machine framework. Upon energization of the solenoid S1 and consequent retraction of the core 102, the valve V1 is so actuated that communication is established between the vacuum conduit 86 and the flexible conduit 82. Upon de-energization of the solenoid S1 the valve V1 is actuated under the influence of a spring 104 so that communication is established between the flexible conduit 82 and the atmosphere through the conduit 84.

The shut-off valve V2 operates under the control of a valve handle 106 which is pivoted to an operating rod 108, which in turn is connected to the core 110 of a solenoid S2 which is pivoted as at 112 to the lower end of the previously mentioned suspension rod 52. When the solenoid S2 is energized the shut-off valve V2 becomes closed and when the solenoid S2 is de-energized the valve V2 becomes opened under the influence of a spring 114. The chamber 42 communicates through a flexible conduit 120 with the outlet side of a shutoff valve V4 having an inlet connection 122 for water. The valve V4 is suitably mounted within the tank 12 and is submerged beneath the water level of the fiber bath.

The valve V4 operates under the control of an operating handle 121 which is pivoted to an operating rod 123 secured to the movable core 126 of a solenoid S4 which is pivoted as at 128 to the side wall of the tank 12.

Figure 3:
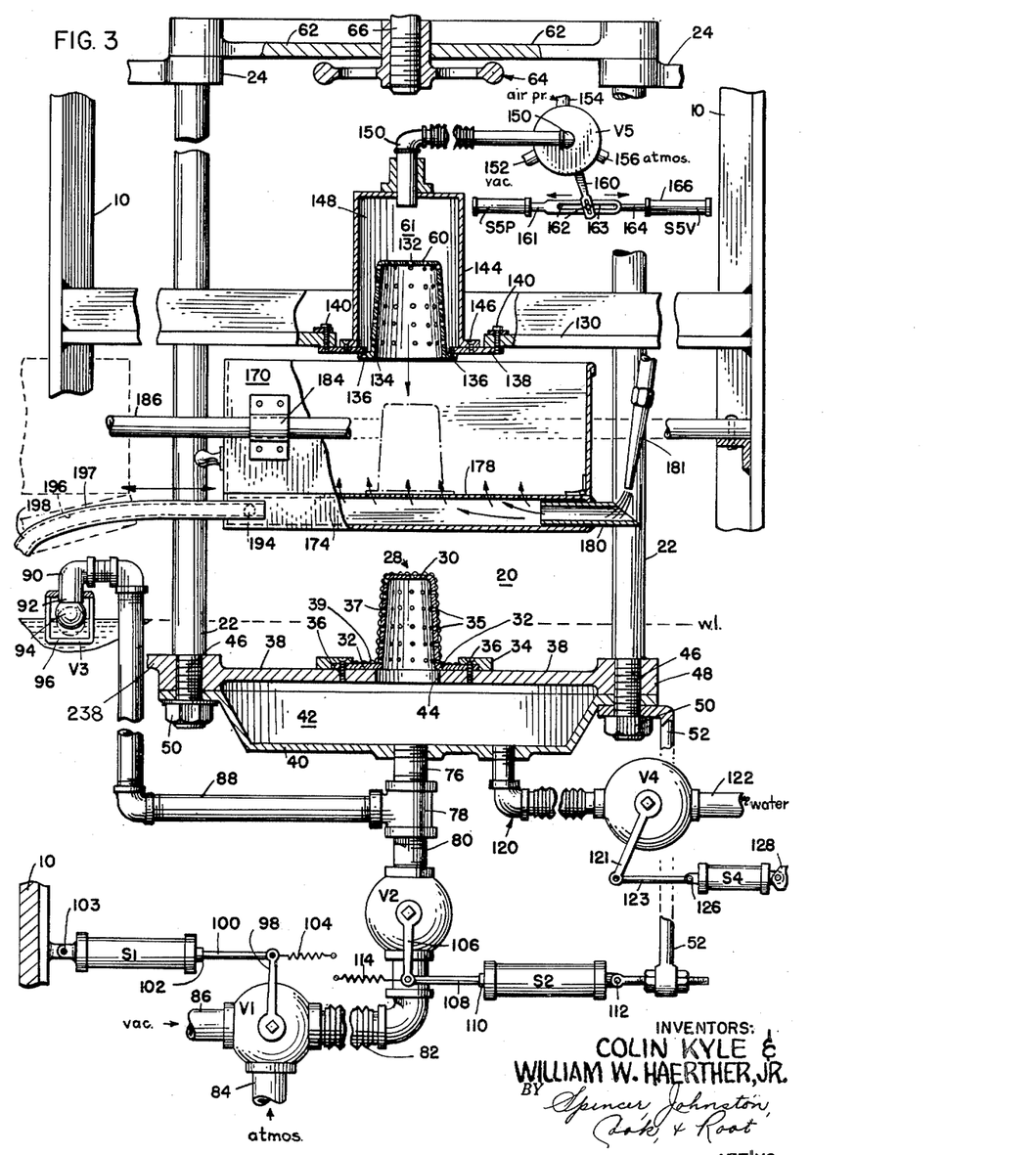
Fig. 3 is a fragmentary enlarged detail sectional view taken transversely through the machine in the vicinity of the felting and drying zones. In this view the parts assume the position they occupy at a point intermediate the hot drying portion of the machine cycle.
Figure 4:
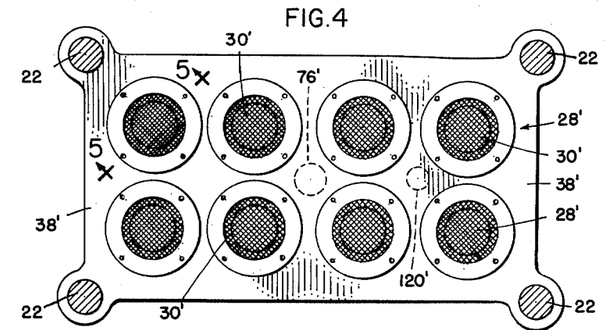
Fig. 4 is a top plan view of a gang former construction which may be employed in connection with the present invention when it is desired to form multiple mold elements during a single machine cycle.
Figure 5:
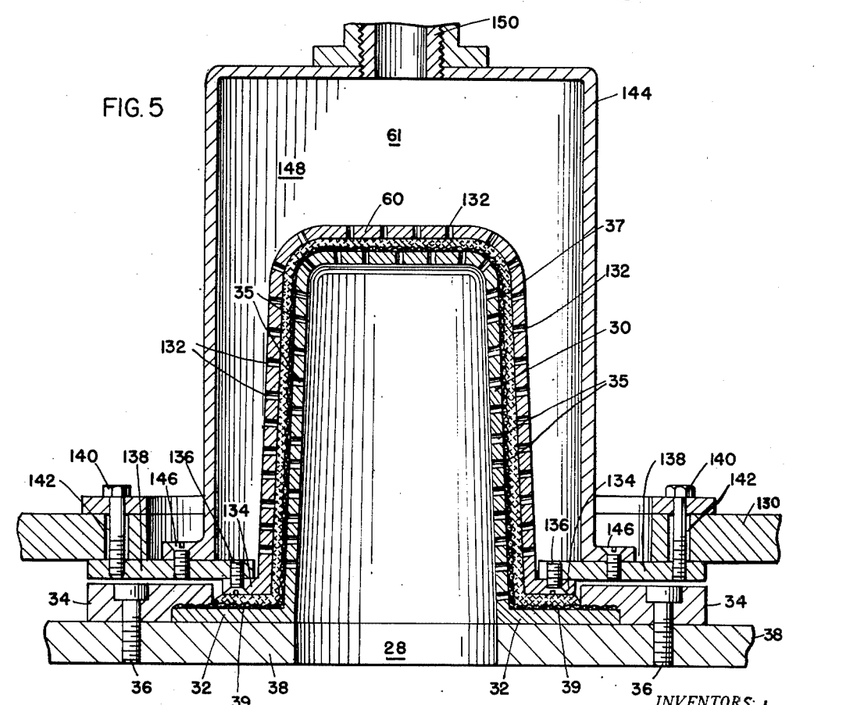
Fig. 5 is an enlarged detail sectional view taken centrally through the male and female formers when the same are in position of registry and showing the accreted blank in position between the two formers.

Referring now to Figs. 3 and 5, the female mold assembly 61 is adjustably carried upon a supporting plate or table 130 suitably mounted on the machine framework 10. The assembly includes the female former proper 60, which is of inverted cup-shaped design and which is provided with a series of openings 132 through the walls thereof. The lower end of the female former 60 is provided with a laterally extending attachment flange 134 which is secured by means of anchoring screws 136 to a ring member 138, which in turn is adjustably secured to the plate or table 130 by means of studs 140 which project through openings 142 provided in the table 130 and which openings are somewhat larger in diameter than the diameter of the studs 140 to permit limited adjustment of the entire female mold assembly 61 relative to the table 130. A closure member 144 is secured by means of anchoring screws 146 to the ring member 138 and provides a chamber 148 therein by means of which air above, below, or at atmospheric pressure may be applied to the female former 60. The chamber 148 communicates through a conduit 150 with the outlet side of a 3-way valve V5 having a conduit 152 connected to a source of vacuum and an inlet 154 connected to a source of air under pressure and a conduit 156 communicating with the atmosphere.

The valve V5 operates under the control of a valve handle 160 which is normally maintained in a position wherein the atmosphere inlet 156 is operatively connected through the valve outlet to the conduit 150. A solenoid S5p has its core 161 connected by means of a pin and slot connection 162 to the handle 160 and operates when energized to move the handle to a position wherein the conduit 150 is connected to the conduit 152 which supplies vacuum to the valve. A handle 160 is also connected by means of a pin and slot connection 163 to the movable core 164 of a solenoid S5v which operates when energized to move the handle 160 to a position wherein the conduit 150 is operatively connected to the conduit 154 which in turn is connected to a source of air under pressure.

As shown in Figs. 3 and 5, the female mold assembly 61 is so disposed on the table 130 that the female former 60 is in axial alignment with the male former 30 so that the latter may be brought into a position of registry with and close proximity to the female former when the carriage 20 is in its uppermost position.

During the description of the operation of the apparatus subsequently to be made, a description will be given of how the filter blanks are accreted on the submerged male former 30 when the carriage 20 is at its lowermost position. It will also be described how when the carriage is elevated the moist accreted blank is brought into register with the female former and transferred to the latter, and the carriage again lowered to return the male former 30 to the fiber bath. After the carriage has been thus lowered to a sufficient extent to provide proper clearance, means are provided for projecting a unitary casing member 170, hereinafter referred to as the "oven" (Figs. 1 and 7), beneath the female mold assembly 61 for the purpose of performing a hot drying operation upon the moist accreted blank carried on the female former 60.

The casing or oven 170 (Figs. 3 and 7) is of rectilinear design and is in the form of an open tray-like structure having continuous marginal sides 172 and a hollow bottom piece 174 which is hingedly secured as at 176 to one of the sides 172. The hollow bottom piece is provided with a perforate upper wall 178 and a plurality of flame-guiding tubes or flues 180 communicate with the interior of the hollow bottom piece at the forward edge thereof as shown in Fig. 3. The oven assembly just described is slidably disposed by means of guide brackets 184 on a pair of guide rods 186 suitably secured to the framework 10 and is movable from a retracted position at one side of the female mold assembly 61 to an advanced position wherein it directly underlies the female mold assembly so that the upper rim of the open-ended oven is in close proximity to the plate or table 130. When the oven is in its advanced position the flues 180 move into register with the flames which issue from a plurality of gas burners or jets 181 suitably secured to the machine framework.

Figures 6, 7:
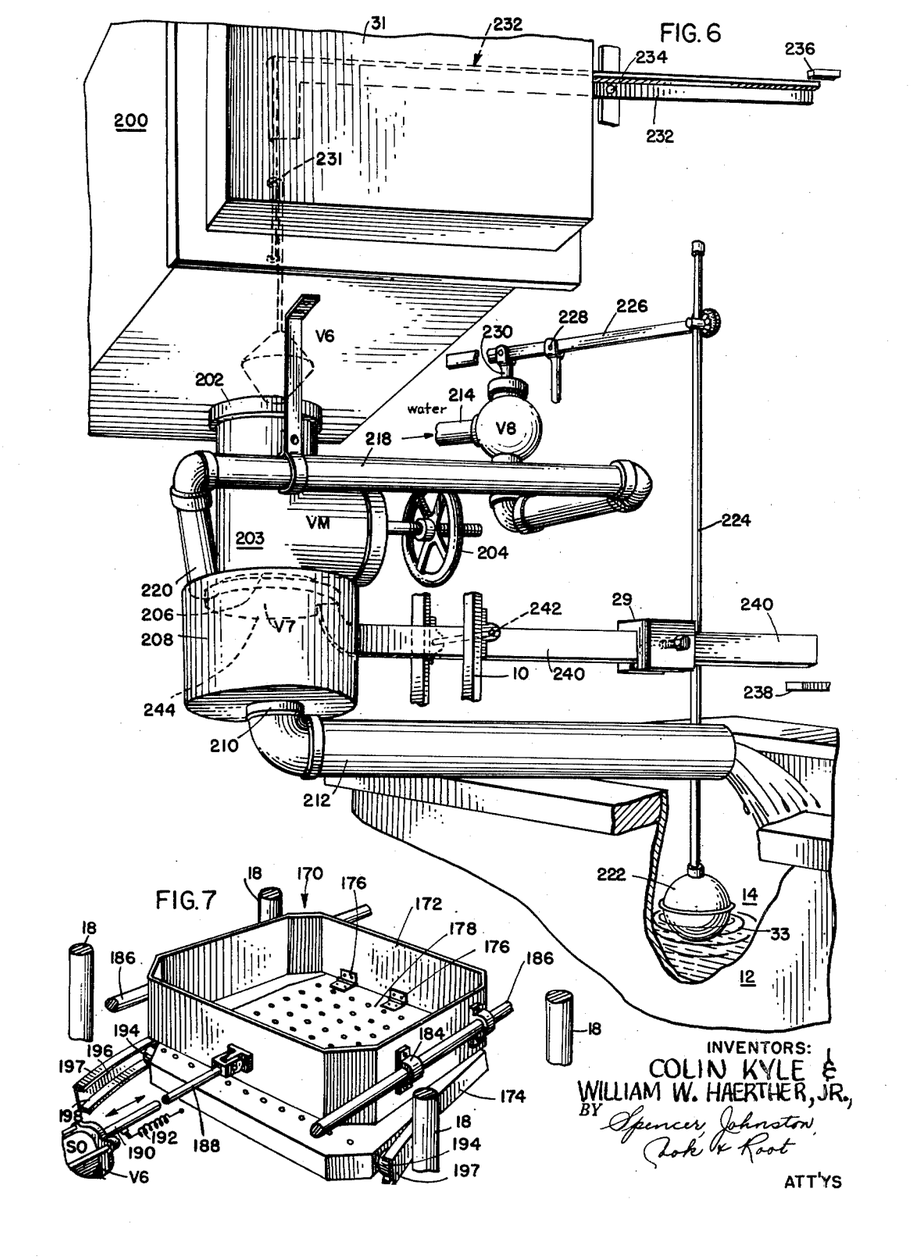
Fig. 6 is a perspective view of the mechanism by means of which the liquid and solid materials are supplied to the fiber bath and by means of which the proportions of these materials may be varied.
Fig. 7 is a perspective view of the so-called "oven" employed in connection with the present invention and showing the manner in which it is advanced or retracted.

Referring now to Fig. 7, one wall 172 of the oven 170 is operatively connected by means of a connecting rod 188 to the movable core 190 of a solenoid SO, hereinafter referred to as the oven solenoid. Upon energization of the solenoid SO and consequent retraction of its core 190 the oven is drawn to its out-of-the-way retracted position. Upon de-energization of the solenoid SO the oven is adapted to be projected to its advanced position underlying the female mold assembly 61 under the influence of a coil spring 192.

When the oven is in its advanced position, the hollow bottom piece 174 thereof remains closed upon the sides 172 and when the oven is moved to its retracted position the bottom piece is adapted to move to an open position wherein the finished articles ejected from the female former 60 into the oven are discharged from the oven into a suitable receptacle (not shown) provided at the discharge station. Toward this end, a pair of rollers 194 are provided at the opposite sides of the bottom piece 174 adjacent the free swinging edge thereof. The rollers 194 are adapted to ride in guideways 196 provided in a pair of channel members 197 suitably mounted on the machine framework. The channel members 197 are provided with downwardly extending portions 198 which operate during retraction of the oven 170 to carry the follower rollers 194 downwardly and thus swing the bottom piece 174 of the oven to its open position so that the articles may fall by gravity into the receptacle provided for them. During the advancing stroke of the oven the rollers 194 ride upwardly on the channel members 197 to close the bottom piece on the side walls 172 of the oven.

Referring now to Fig. 6 wherein the mechanism for maintaining the proper liquid level of the fiber bath in the tank 12 and for varying the proportion of the ingredients supplied to the fiber bath 14 is shown, an overhead feed supply tank 200 suitably supported on the framework 10 is adapted to contain a relatively dense dispersion of the fibrous filter material in the suspension liquid which in the present instance may be water. The tank 200 is provided with a bottom outlet 202 communicating with a measuring chamber 203, the size of which may be varied by valve VM which operates under the control of a handwheel 204. The measuring chamber 203 is provided with an outlet opening 206 which empties into a hopper or funnel 208 having a bottom outlet 210 communicating with a conduit 212 which empties into the accretion tank 12. A supply conduit 214 for water communicates with a float valve V8 which in turn communicates with a conduit 218 whose outlet end 220 communicates with the hopper 208. The float valve V8 operates under the control of a float element 222 disposed within the tank 12 and connected by means of a plunger 224 to a rocker arm 226, pivoted as at 228 to a stationary part of the framework 10 and which has connected thereto the valve stem 230 of the float valve V8. The passage of liquid through the float valve V8 is thus controlled by the water level of the liquid in the fiber bath 14 and thus, when the water level rises to a predetermined degree, the valve V8 is completely shut off.

The opening 202 in the bottom of the supply tank 200 is adapted to be controlled by means of a ball valve V6 operatively and slidably connected as at 231 to a framelike structure 232 pivoted as at 234 to a stationary part of the machine framework. The valve actuating member 234 is actuated by a finger 236 on one of the sleeves 26 (see Fig. 2). A rocker arm 240 pivoted as at 242 to a stationary part of the machine framework and which carries at one end thereof a clapper type valve element 244 constitutes a control valve V7. When the carriage 20 moves downward from its uppermost position, the finger 236 will engage the arm 232 and cause the arm 232 to tilt about the axis 234, causing the valve V6 to open. Just as soon as the finger 236 moves out of contact with the arm 232, the weight of ball valve V6 causes it to close.

The valve V7 is opened on the upstroke of the carriage 20 by the finger 238 striking against arm 240 causing arm 240 to pivot around pivot 242 and thereby lower the clapper 244, whereupon a predetermined charge of fibers flows by gravity from measuring chamber 203 through opening 206, hopper 208, opening 210 and conduit 212 to the accretion tank 12. The weight 29 causes valve V7 to close and remain closed except when arm 240 is actuated by finger 238.

It is important for the purpose of the invention that the fibers be replenished in tank 12 and be uniformly distributed in the water therein prior to the accretion operation. In the apparatus described it will be observed that the replenishment takes place while the former (or formers) is rising from the tank 12 preparatory to the discharge of the formed articles therefrom.

The relatively large quantities of liquid withdrawn from the fiber bath will be automatically replaced under the control of the float valve V8 which will admit water through the conduit 218 to the hopper 208.

*The timing mechanism*

Referring now to Fig. 3, it will be seen that the 2-way valve V1 operates under the control of the solenoid S1; the shut-off valve V2 operates under the control of the solenoid S2; the float valve V3 operates under the control of the float 94; the shutoff valve V4 operates under the control of the solenoid S4; the 3-way valve V5 operates under the control of the two solenoids S5v and S5p; and the valves V6 and V7 (Fig. 6) operate under the control of the movements of the carriage 20.

Figures 8, 9:
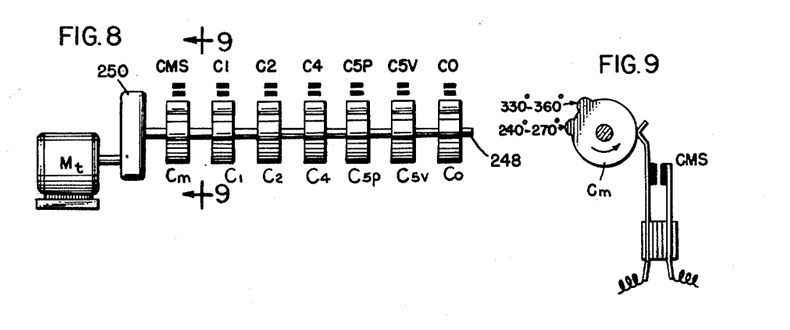
Fig. 8 is a side elevational view, schematic in its representation, of the timing mechanism employed in connection with the present invention.
Fig. 9 is a sectional view taken substantially along the line 9—9 of Fig. 8.
Figure 10:
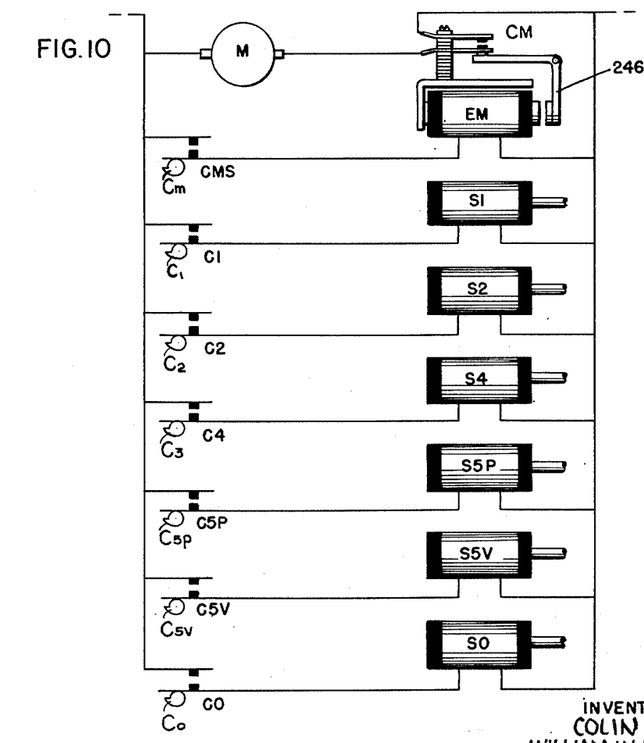
Fig. 10 is a wiring diagram of the electric circuits employed in connection with the present invention.

Each of the solenoids exists in an independent circuit and each solenoid is operated under the control of a single pair of contacts. As shown in Figs. 8 and 10, the solenoid S1 operates under the control of a pair of normally open cam controlled contacts c1. The circuits for the remaining solenoids S2, S4, S5v, and S5p are similar to the circuit for the solenoid S1 and these latter solenoids operate independently under the control of respective cam controlled contacts c2, c4, c5p, and c5v. The motor M operates under the control of a pair of cam controlled motor contacts cm which are normally open but which are adapted to become closed under the control of an electromagnet Em, which is operable upon energization thereof and consequent attraction of its armature 246 to close the pair of contacts cm and complete the motor circuit. The magnet Em is disposed in a circuit including a pair of cam controlled contacts cms.

The solenoid SO which controls the movements of the oven 170 is disposed in a circuit including a pair of cam controlled contacts co which are normally open but which are adapted upon closure thereof to complete the circuit through the solenoid SO.

The various contacts cms, c1, c2, c4, c5p, and c5v, cm and co (Figs. 8 and 10) operate under the control of respective cams C1, C2, C4, C5p, and C5v, Cm and Co which are mounted on a common shaft 248 operatively connected through a gear reduction device 250 to the motor Mt which may be of the 60-cycle synchronous variety adapted to operate continuously from the usual commercial 60-cycle alternating current supply.

*The operation of the apparatus*

Referring now to the time chart of Fig. 11 wherein a complete cycle of the machine operations is diagrammatically illustrated at the zero point in the cycle, the carriage 20 (Fig. 3) assumes its lowermost position with the male former 30 completely submerged in the fiber bath 14. The pair of normally open contacts c1 are closed and as a consequence the solenoid S1 (Fig. 10) is energized so that its core 102 is retracted and the valve V1 is so conditioned that the source of vacuum connected to the conduit 86 communicates with the flexible conduit 82 and consequently with the valve V2. The contacts c2 are likewise closed at the commencement of the machine cycle and the solenoid S2 likewise energized so that the suction applied to the valve from the conduit 82 is applied through the conduits 80, a T-fitting 78 and conduit 76 to the male former 30, thus drawing the liquid material of the fiber bath through the perforations 35 and screen 37. The contacts cms are open and therefore the solenoid Em is de-energized so that the contacts cm in the motor circuit remain open and the motor M is de-energized. The contacts cms remain open and the motor M remains de-energized until approximately 240° in the machine cycle. The contacts c1 and c2 remain open until cms closes. They then close causing valves V1 and V2 to open and suction to be applied to the male former 30 so that the accreted blank will build up on the screen 37 to the desired degree of thickness while the former 30 is moving upward in the bath 14.

As soon as the accreted blank has been deposited on the screen 37 to the desired thickness and at approximately 240° in the machine cycle the contacts cms become closed, thus energizing the magnet Em and closing the contacts cm in the motor circuit, thus energizing the motor M and causing the circular cam wheel 70 (Figs. 1 and 2) to rotate and elevate the cam follower roller 68 and consequently the carriage 20. At the approximate region in the machine cycle where the male former 30 reaches the water line of the fiber bath and emerges from the fiber bath, at approximately 255° in the machine cycle, the ball float 94 falls away from its valve seat 92, thus exposing the chamber or cavity 42 to the atmosphere. At the same time the contacts c1 become open, thus de-energizing the solenoid S1 and allowing the valve handle 98 of the valve V1 to move to a position wherein atmospheric pressure leading from the conduit 84 passes through the valve V1 and valve V2 (now open) to the cavity 42. The cavity 42 is thus drained of any liquid which may be contained therein as a result of the accretion operation and the carriage continues to rise until approximately 270° in the machine cycle, at which point it is fully raised and the male former 30 has moved into close proximity and register with the female former 60. At this point, which is approximately 270° in the machine cycle, the contacts cms again open, thus de-energizing or stopping the motor M and allowing the carriage 20 to remain fully elevated.

As soon as the male former moves into such register with the female former at approximately 270°, the pair of contacts c5v become closed, thus connecting the vacuum supply conduit 152 to the outlet conduit 150 leading to the chamber 148 of the female mold assembly 61. The degree of vacuum applied to the chamber 148 is sufficient to draw the partially formed moist blank into adherence with the female former 60 and since the cavity 42 of the male mold assembly 28 is connected to atmosphere, the partially formed blank will adhere to the interior of the female former 60 and disassociate itself from the exterior of the screen 35 on the male former 30. There is no discernible transfer of the moist filter element from the male mold assembly to the female mold assembly since actual motion of the partially formed blank does not take place. The male and female formers are in close position of registry and since suction is applied from the female former to the exterior of the moist blank article while the interior of the article is subjected to atmospheric pressure, the female former takes control over, and retains the blank article as the male former is withdrawn downwardly.

The application of suction to the female mold assembly by means of the valve V5 continues as long as the contacts c5v remain closed, and these contacts do remain closed throughout the remainder of the machine cycle and throughout a portion of the next succeeding machine cycle. Immediately after the transfer operation just described takes place, continued application of suction to the female mold assembly serves to draw air through the moist blank and effect a cold drying operation wherein a portion of the moisture is removed from the blank.

The carriage remains elevated from approximately 270° in the machine cycle to approximately 330° and during this time suction continues to be applied to the female former in the manner previously described, while the male former is subjected to atmospheric pressure. At this point in the machine cycle, namely approximately 330°, the contacts cms (Figs. 8, 9 and 10) again become closed and the motor M again becomes energized, thus resuming the rotary motion of the cam wheel 70 to lower the carriage 20 and return the male former 30 to the fiber bath 14. As the carriage commences its descent, the male former pulls away from the blank which now adheres to the cavity provided by the female former 60, and at a point where the carriage 20 approaches its lowermost position (at, say, 345° in the machine cycle) the contacts c4 become closed for a brief interval of time, whereupon the solenoid S4 becomes energized and opens the valve V4, thus admitting water under pressure from the inlet connection 122 to the interior of the cavity 42 through the conduit 120. A brief charge of water under pressure is thus applied to the male former 30 and any fibrous particles adhering to the screen 32 of the male mold assembly will be dispersed and fall into the fiber bath. Simultaneously with the closing of the contacts c4, the contacts c2 become open thus de-energizing the solenoid S2 and causing the shutoff valve V2 to become closed so that the charge of water applied to the male mold former 30 will not escape from the cavity 42 through the valves V2 and V1.

At a point in the machine cycle which occurs shortly after the time when the carriage 20 commences its descent, approximately 335°, the pair of contacts co become closed, thus energizing the solenoid SO and causing the oven 170 to be projected inwardly to a position directly beneath the female mold assembly 61. At the time the oven assembly reaches its final position beneath the female mold assembly the upper surface of the male former 30 will just clear the path of movement of the descending oven 170, and, as shown in the time chart of Fig. 11, this point occurs at approximately 340° in the machine cycle. With the oven thus in position, its upper open rim portion occupies a position in close proximity to the attachment flange 134 and anchoring ring 138 so that a fairly effective seal exists between the interior of the oven and the interior of the female former.

As soon as the oven 170 arrives at its innermost position and moves into register with the female mold assembly, the tubes 180 move into register with the flame issuing from the ends of the burners 181, thus directing the flame into and through the tubes 180 and causing hot air to permeate the oven 170 and be drawn by the application of suction to the female former 60 occasioned by continued closure of the contacts c5v to perform what is termed the hot drying cycle of the machine operation. This hot drying cycle, during which the oven remains in register with the female mold assembly and the contacts c5v remain closed, is carried into the next machine cycle with the contacts c5v opening at approximately 150° in the succeeding cycle and with the oven being withdrawn at approximately 220° in the machine cycle.

When the carriage arrives at its lowermost position at 360° the next machine cycle commences. The contacts co, however, remain closed during a portion of the next machine cycle and the oven 170 consequently remains in register with the female mold assembly 61 until approximately 220° in the succeeding cycle, at which time the contacts co become open and the solenoid SO is de-energized to permit the oven to be retracted. Immediately prior, however, to such retraction of the oven the contacts c5p become momentarily energized at approximately 200° in the machine cycle, thus causing the valve V5 to establish communication between the air inlet conduit 154 and the cavity 148 of the female mold assembly 61. A blast of air is thus applied to the female former 60 and the dried and completed filter element adhering thereto is blown from the female former 60 and forced by gravity into the oven 170, which is about to be withdrawn or retracted from register with the female mold assembly. As the oven is withdrawn at approximately 220° in the succeeding machine cycle, the follower rollers 194 riding in the cam rails 196 cause the bottom piece 174 of the oven to swing downwardly and release the article by gravity at the discharge station. It is to be noted by reference to Fig 11 that during the interval of time existing from approximately 145° in a machine cycle when the contacts c5v become open to approximately 200° in the machine cycle when the contacts c5p become closed, the valve V5 is in the intermediate position shown in Fig. 3 and atmospheric pressure is applied from the connection 156 to the cavity 148 of the female mold assembly. Likewise from the time the contacts c5p become opened shortly after 200° in the machine cycle until the contacts c5v again become closed at approximately 270° in the machine cycle, the valve V5 also remains in its neutral position so that atmospheric pressure is applied to the female former 60. The application of atmospheric pressure to the female mold assembly at approximately 145°, occasioned by the valve V5 assuming its neutral position, terminates the hot drying operation, which has been carried into a succeeding machine cycle.

The accreted article is forcibly ejected from the female former by the blast of air pressure which occurs when the contact c5p closes at approximately 200° in the machine cycle. The next application of atmospheric pressure to the female mold assembly, which commences shortly after 200° and terminates at approximately 255° in the machine cycle, performs no function other than providing a neutral position for the valve V5 wherein neither air pressure nor vacuum is applied to the cavity 148. Since atmospheric pressure is applied to the female former during this interval, the cavity 148 is bled to atmosphere through the valve V5, so that when the next succeeding article is moved into position of registry with the female former no pressure will be built up in the cavity as the male former moves into position, which would tend to disarrange the loosely packed fibers on the incoming blank.

The above description has illustrated the manner in which a single accreted article is made commencing at the zero point in the machine cycle where the accreting operation begins and terminating at a predetermined point in the next succeeding cycle where the completed article is discharged from the oven at a discharge zone, thus the complete formation of an article consumes one entire machine cycle and somewhat over one-half of the next succeeding machine cycle to the point at approximately 200° where the contacts $c5p$ close to energize a solenoid $S5p$ and condition the valve V5 for application of air under pressure to the female former 60 to discharge the completed article into the oven. One machine cycle, however, is considered to extend only from the moment when the carriage 20 arrives at its lowermost position with the male former in the fiber bath, throughout the duration of time that it remains elevated, to the moment when it again has fully descended preparatory to commencing the accretion of a second accreted article.

A feature of the invention is the provision of means for accreting an article (or plurality of articles) while simultaneously drying a previously accreted article (or plurality of articles).

While the machine herein illustrated and described above is fully automatic in its operation, it is to be distinctly understood that the process of the present invention may be carried out manually, utilizing apparatus similar to that described above but from which the various automatic controls have been eliminated. The process may also be carried out by a machine which is only semi-automatic in its operation and in such an instance ordinarily means will be provided for vertically reciprocating the male former assembly or its carriage and for terminating such reciprocation when the male former is in its lowermost position to permit the accretion operation to take place, and when the carriage is in its uppermost position to permit the transfer and drying operations to take place. Furthermore, while each of the automatically controlled valves of the present apparatus is shown as being operated under the direct control of an actuating solenoid, it is obvious that other mechanism as for example a piston operated device, which operates under the control of a valve, which in turn is solenoid operated, may be employed. This latter type of valve control mechanism will be found useful particularly where the valve undergoing control is submerged in the fiber bath.

Similarly, while the oven 170 is shown as operating under the control of the thrust of the core of a solenoid, the oven may, if desired, be piston operated under the control of a valve, which in itself is electrically controlled.

Instead of employing a separate timer motor, the main motor shaft may be extended and provided with the necessary timer cams.

It will be understood that the main motor can be operated continuously provided a suitably contoured cam is substituted for circular cam 70.

The modifications that may be made to the present apparatus, while still preserving the essential features as herein described, are numerous and as a consequence the invention in its broader aspects is not to be limited to the exact structure shown.

The invention is hereby claimed as follows:

1. An apparatus for forming fibrous articles by a wet accretion process comprising means providing a fiber-liquid bath, a porous former disposed outside of the level of the liquid in said bath, a complementary porous former movable from a position wherein it is submerged in said bath to an advanced position wherein it occupies a position in close proximity to and in register with said first-named former, means for moving said second-named former between said positions, means for applying suction to the submerged second-named former to draw liquid from the fiber bath therethrough and accrete a blank thereon, means for applying suction to the first-named former when the second-named former is in its position of registry therewith to transfer the moist article from the second-named former to the first-named former, a chamber movable from a retracted position at one side of the first-named former to a position adjacent the mouth of the latter, means to move said chamber to said adjacent position while said formers are spaced apart, and means for providing hot gases in said chamber when in said adjacent position for transmission of said gases through the article and first-named former on application of suction to the latter.

2. An apparatus for forming fibrous articles by a wet accretion process comprising means providing a fiber-liquid bath, a porous female former disposed outside of the level of the liquid in said bath, a porous male former movable from a lower position wherein it is submerged in said bath to an advanced position wherein it occupies a position in close proximity to and in register with said female former, means for moving said male former between said positions, means for applying suction to the submerged male former to draw liqjuid from the fiber bath therethrough and accrete a blank thereon, means for applying suction to the female former when the male former is in its position of registry therewith to transfer the moist article from the male former to the female former, a chamber movable from a retracted position at one side of said female former to a position adjacent the mouth of said female former, means to move said chamber to said adjacent position while said formers are spaced apart, means for introducing hot gases to said chamber when in said adjacent position for transmission of said gases through the article and female former on application of suction to the latter, and means to discharge an article from said female former to said chamber.

3. An apparatus for forming fibrous articles by a wet accretion process comprising means providing a fiber-liquid bath, a porous female former disposed above the level of the liquid in said bath, a porous male former movable from a lower retracted position wherein it is submerged in said bath to an upper advanced position wherein it occupies a position in close proximity to and in register with said female former, means for moving said male former between its upper and lower positions, means for applying suction to the submerged male former to draw liquid from the fiber bath therethrough and accrete an article thereon, means for applying suction to the female former when the male former is in its upper position of registry therewith to transfer the moist article from the male former to the female former and also to effect drying of the moist article, a chamber reciprocable from a retracted position at one side of said female former to a position adjacent the mouth of said female former, means to reciprocate said chamber between said positions while said formers are spaced apart, means for introducing hot gases to said chamber when in said adjacent position for transmission of said gases through the article and female former on application of suction to the latter, and means to discharge an article from said female former to said chamber.

4. In an apparatus for forming fibrous articles by a wet accretion process, means providing a fiber bath, a porous female former positioned above the level of liquid in said fiber bath, a porous male former movable from a lower retracted position wherein it is submerged in said fiber bath to an upper advanced position wherein it is in close proximity to and in register with the female former, means for moving said male former between its upper and lower positions, means operable when said male former is in its submerged position for applying suction thereto to draw liquid from the fiber bath through the same and accrete a blank thereon, means operable when the male former is in its upper advanced position for applying suction to the female former to transfer the moist blank from the male former to the female former and to thereafter effect partial drying of the blank, means for blowing a fluid from within the male former through the openings therein to clean the surface thereof, a hollow receptacle movable from a retracted position at one side of the female former to an advanced position wherein it underlies the female former in sealing relationship with respect thereto, means for moving said receptacle between its advanced and its retracted positions, and means operable during continued application of suction to the female former for introducing hot gases to said receptacle when the latter is in its advanced position for transmission of such gases through the blank and female former by the application of such suction to the latter to complete the drying of the blank.

5. In a continuously operable cyclic apparatus for repeatedly forming fibrous articles by a wet accretion process, means providing a fiber bath, a porous female former positioned above the level of liquid in said fiber bath, means including said female former providing a variable pressure cavity for said female former, a porous male former movable from a lower retracted position wherein it is submerged in said fiber bath to an upper advanced position wherein it is in close proximity to and in register with the female former, means including said male former providing a variable pressure cavity for the male former, means for moving said male former between its upper and lower positions, an electric motor, cam means operatively connecting said motor and male former for moving the latter between its upper and lower positions, a control circuit for said motor, a shutoff valve having a port communicating with the cavity of said male former, a two-way valve having an outlet port communicating with the inlet port of said shutoff valve and having an inlet port communicating with a source of vacuum and a second inlet port communicating with the atmosphere, a solenoid for controlling the operation of said shutoff valve, a solenoid for controlling the operation of said two-way valve, a third valve having an outlet port communicating with the cavity of said male former and having an inlet port communicating with a source of liquid under pressure, a solenoid for controlling the movement of said latter valve, a three-way valve having an outlet port communicating with the cavity of said female former and having an inlet port communicating with said source of vacuum, an inlet port communicating with a source of air under pressure and an inlet port communicating with the atmosphere, a solenoid for controlling said three-way valve, a receptacle movable from a retracted position at one side of said female former to an advanced position wherein it underlies the female former in sealing relationship with respect thereto, a solenoid for controlling the movements of said receptacle, and timing mechanism controlling the operation of said solenoids and motor circuit.

6. In a continuously operable cyclic apparatus for repeatedly forming fibrous articles by a wet accretion process, means providing a fiber-liquid bath, a porous female former disposed above the level of liquid in said bath, means including said female former providing a variable pressure cavity for said female former, a porous male former movable from a lower retracted position wherein it is submerged in said bath to an upper advanced position wherein it is in close proximity to and in register with said female former, means including said male former providing a variable pressure cavity for said male former, a source of fluid under pressure connected to said male former cavity, a source of vacuum connected to said male former cavity, a vent to the atmosphere from said male former cavity, means automatically closing said vent when said male former is submerged, means automatically opening said vent on emergence of said male former from said bath, a source of gas under pressure connected to said female former cavity, a source of vacuum connected to said female former cavity, a receptacle movable to a position adjacent the mouth of said female former, and timed means for operatively communicating said first-named vacuum source with said male former cavity when said male former is submerged, for regulating the period of submergence of the latter, for moving said male former to said advanced position following said period, for operatively communicating said second-named vacuum source with said female former cavity when said male former is in said advanced position and when the latter is subsequently retracted, for moving said male former to said retracted position following said communication of said second-named vacuum source, for operatively communicating said fluid source with said male former cavity following retraction of said male former from said female former, for regulating the period of said communication of said fluid source, for operatively communicating said first-named vacuum source with said male former cavity when said male former is again submerged and following said last-named period, for moving said receptacle to said position adjacent said mouth following retraction of said male former from said female former, and for operatively communicating said gas source with said female former cavity when said receptacle is in said position adjacent said mouth.

7. In a continuously operable cyclic apparatus for repeatedly forming fibrous articles by a wet accretion process, means providing a fiber-liquid bath, a porous female former disposed above the level of liquid in said bath, means including said female former providing a variable pressure cavity for said female former, a porous male former movable from a lower retracted position wherein it is submerged in said bath to an upper advanced position wherein it is in close proximity to and in register with said female former, means including said male former providing a variable pressure cavity for said male former, a source of vacuum connected to said male former cavity, a vent to the atmosphere from said male former cavity, means automatically closing said vent when said male former is submerged, means automatically opening said vent on emergence of said male former from said bath, a source of gas under pressure connected to said female former cavity, a source of vacuum connected to said female former cavity, a receptacle movable to a position adjacent the mouth of same female former, means for providing hot gases in said receptacle when in said position adjacent said mouth, and timed means for operatively communicating said first-named vacuum source with said male former cavity when said male former is submerged, for regulating the period of submergence of the latter, for moving said male former to said advanced position following said period, for operatively communicating said second-named vacuum source with said female former cavity when said male former is in said advanced position and when the latter is subsequently retracted, for moving said male former to said retracted position following said communication of said second-named vacuum source, for operatively communicating said first-named vacuum source with said male former cavity when said male former is again submerged, for moving said receptacle to said position adjacent said mouth following retraction of said male former from said female former, for regulating the period of said communication of said second-named vacuum source when said receptacle is in said position, and for operatively communicating said gas source with said female former cavity following said last-named period.

References Cited in the file of this patent

UNITED STATES PATENTS

| Number | Name | Date |
|---|---|---|
| Re. 19,856 | Chapman | Feb. 18, 1936 |
| 254,826 | Keefe | Mar. 14, 1882 |
| 1,537,195 | Salisbury | May 12, 1925 |
| 1,590,383 | Kirsch | June 29, 1926 |
| 1,717,775 | Hawley | June 18, 1929 |
| 1,788,944 | Chaplin | Jan. 13, 1931 |
| 1,822,020 | Fulcher et al. | Sept. 8, 1931 |
| 1,845,830 | Chaplin | Feb. 16, 1932 |
| 1,918,782 | Randall | July 18, 1933 |
| 1,966,471 | Walters | July 17, 1934 |
| 1,970,608 | Landon | Aug. 21, 1934 |
| 2,017,017 | Randall | Oct. 8, 1935 |
| 2,045,163 | Raffles | June 23, 1936 |
| 2,070,040 | Chapman | Feb. 9, 1937 |
| 2,257,573 | Randall | Sept. 30, 1941 |
| 2,388,828 | Chaplin | Nov. 13, 1945 |
| 2,539,768 | Anderson | Jan. 30, 1951 |
| 2,559,945 | Chaplin | July 10, 1951 |